United States Patent Office 3,274,197
Patented Sept. 20, 1966

3,274,197
SULFO PHTHALOYLACRIDONES
Kurt Weber and Max Staeuble, Basel, Paul Hugelshofer, Otelfingen, Zurich, and Istvan Hari, Basel, Switzerland, assignors to Ciba Limited, Basel, Switzerland, a Swiss company
No Drawing. Filed Nov. 28, 1961, Ser. No. 155,464
Claims priority, application Switzerland, Nov. 29, 1960, 13,356; Jan. 30, 1961, 1,065; Nov. 1, 1961, 12,649
4 Claims. (Cl. 260—276)

The invention herein described relates to new vat dyes containing at least one sulfonic acid group, at least one carboxylic acid amide group, primarily an aroylamino group and 5 to 6 fused rings. The therm "vat dye" includes dyes that can be converted by reduction into a so-called leuco or vatted form, which has better affinity for natural or regenerated cellulose fibers than the unreduced dye, and which can be re-converted into the original chromophore system by oxidation. It therefore excludes derivatives of the so-called bromamine acid and typical wool dyes such as the 1-benzoylamino-2-methyl-4-naphthylamino anthraquinone-carbazole sulfonic acid, since, in the reduced state, they do not exhibit increased affinity for the cellulosic fiber. Suitable vat dyes are especially those of the anthraquinone series, examples being dyes containing a 9:10-dioxoanthracene ring and on to which two or three carbocyclic or heterocyclic rings are condensed, preferably six-membered condensed rings, or which consist of several vattable units bound together by way of a bridge comprising 5 or 6 fused rings or of which at least one possesses 5 or 6 fused rings. Apart from at least one sulfonic acid group, which also remains bound to the chromophore in the vatted state, the dyes can contain the usual substituents of vat dyes as, for example, halogen atoms, alkoxy groups or alkyl groups, as well as so-called reactive substituents (i.e. substituents which, by reacting with one another or with the fiber, bring about firm fixation of the dye on the substrate; for example, chlorotriazinyl, chlorocyameluryl, chloropyrimidyl, halogenpyridazone, acrylamide, and epoxy groups). They must, however, contain at least one carboxylic acid amide group, preferably an acylamino group derived from an aromatic carboxylic acid. Of particular value are those vat dyes in which the sulfonic acid groups are the only sulfur-containing substituents and in which the sulfonic acid group is in the carboxylic acid amide group.

The dyes of the invention can be produced as follows:
(a) By treating a vat dye containing at least 5 or at the most 6 condensed rings and at least one carboxylic acid amide group with sulfonating agents until at least one SO₃H group is introduced;
(b) By submitting to mild hydrolysis a vat dye containing at least 5 or at the most 6 condensed rings, at least one carboxylic acid amide group and at least one sulfonic acid halide group;
(c) By acylating with acylating agents the amino group of vat dyes or vat dye intermediates containing at least one acylatable amino group and at least 5 or at the most 6 condensed rings and, in case there is no —SO₃H group in the dye used as starting material, selecting an acylating agent which, apart from the acylating group, contains at least one sulfonic acid group which is stable in the vat, preferably bound aromatically, or a grouping which is converted into a sulfonic acid group under the conditions of reaction;
(d) By treating a vat dye containing at least one acylamino group, at least 5 or at the most 6 condensed rings and at least one HS grouping, e.g. an HS—CH₂ grouping, with oxidizing agents until the HS grouping is converted into an HO₃S grouping.

The vat dyes used as starting materials for variant (a) of this process must contain 5 or 6 condensed rings, i.e. dyes which, for example, contain an anthradioxazole-, anthradithiazole-, anthradipyrazole-, or anthraquinone-2:3-benzothiophene ring, or an anthraquinone-2:3-benzofuran ring and, preferably, a dibenzpyrenequinone- or a phthaloylacridone nucleus. It is of advantage if the vat dyes used as starting materials contain one to two carbamide groups, particularly benzoylamino groups. Examples are the benzoylamino-anthraquinone-acridone, the benzoylamino-anthanthrone, the benzoylamino-dibenzpyrenequinone and the corresponding aroylamino derivatives which, instead of a benzoylamino group, contain, for example, a naphthoylamino-, a chloro-, methyl- or phenyl-benzoylamino group, a cinnamoylamino-, benzylbenzoylamino-, chryseneoylamino-, pyreneoylamino- or a fluorantheneoyl-amino group. Two phthaloylacridones can also be bound via a dicarboxylic acid diamide bridge either together or asymmetrically each to an anthraquinone nucleus.

The sulfonation of such vat dyes can be carried out by the usual methods, e.g. by warming with oleum or in sulfuric acid. Treatment with chlorosulfonic acid yields sulfonic acid chlorides which, in accordance with variant (b) of this process can be converted into the vat dyes of this invention by mild hydrolysis, e.g. by means of alkali hydroxides or alkali carbonates in aqueous medium.

The starting materials for variant (c) of this process are amino derivatives containing at least 5 or 6 condensed rings. Examples are 4-, 5- or 8-aminoanthraquinone-2:1(N)-acridone, aminodibenzpyrene quinone, aminoanthanthrone, 4'- or 5'-amino-1,1'-dianthraquinonylaminoanthanthrone and the compounds with the formula

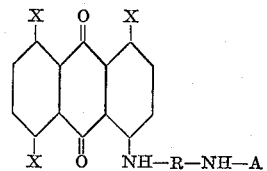

in which at least two of the X's represent hydrogen atoms and the other an NH₂ group, whereas A represents a phthaloylacridone radical and R a triazine radical, or a —CO—R—CO— group in which R is an arylene radical.

Suitable acylating agents, which contain at least one sulfonic acid group or a grouping which can be converted into a sulfonic acid group under the conditions of reaction, are the halides of sulfo-carboxylic acid, especially sulfobenzene carboxylic acid chlorides and, primarily, the sulfochlorides of benzene carboxylic acid. Likewise suitable are disulfobenzene carboxylic acid chlorides, sulfoisophthalic acid chlorides, sulfofurane- and sulfothiophene carboxylic acid halides, sulfocinnamoyl chloride, sulfonaphthalene carboxylic acid chlorides and similar substances, as well as intra-molecular anhydrides of o-carboxybenzene sulfonic acids.

The starting amines can be reacted with the acylating agents at an elevated temperature in an inert organic solvent such as nitrobenzene, chlorobenzene or o-dichlorobenzene, if necessary with the addition of tertiary bases; however, the reaction is best carried out in tertiary bases, e.g. in anhydrous or nearly anhydrous pyridine bases or pyridine. The molar ratios of the components should be so chosen as to ensure that for one acylatable amino group of the anthraquinone radical there is at least one carboxylic acid chloride group.

If carboxylic acid halides which contain a sulfohalide group instead of an HO₃S group are chosen as acylating agents, vat dyes containing sulfo-halide groups are obtained which can be used as starting materials for variant (b) of this process. If the carboxylic acid halides to be used as acylating agents contain, for example, a Cl—CH$_2$ group they can, after acylation, be converted into an HS—CH$_2$ group by reaction with thiourea and cleavage of the isothiuronium group with alkali. This HS—CH$_2$ group can be oxidized to a sulfonic acid group with hydrogen peroxide, for example, according to variant (d) of this process.

The dyes produced by this process are new. They can be used for dyeing many types of material, but are specially suitable for dyeing and printing textiles made of natural or regenerated cellulose fibers by the usual vat-dyeing and printing methods. The dyeings and prints produced therewith are, as a rule, fast to chlorine, exhibit excellent fastness to light and wetness, and possess good fastness to soda boiling.

Dyeings produced with the dyes of this invention are also fast to dry cleaning and migration. Thus, fabrics dyed therewith can be coated with synthetic resins, for example with polyvinyl chloride, without the dye migrating into the coating, this being specially important in the manufacture of artificial leather.

Compared with the classical vat dyes, the dyes of the invention, which are permanently water-soluble, have the advantage of possessing better level-dyeing and penetrating properties. In machine-dyeing they do not give rise to faulty dyeings caused by precipitation of re-oxidized dye when foam is formed. The pigmenting operation necessary when using classical vat dyes for dyeing wound packages, e.g. cheeses, or knitted goods over a winch is eliminated when working with the new dyes. Furthermore, they can be applied in the form of solutions in the quick-running padding procedures, and do not have to be marketed in a finely divided form or in a special paste form with their accompanying disadvantages (instability of the paste, dusting, and the necessity of one or several operations to manufacture finely divided powders). Finally, they are generally very easily vatted, quite often at room temperature and with mild reducing agents. They show very good solubility in the vat and, in particular, give strong and very level dyeings on regenerated cellulose, which are of the same shade as corresponding dyeings on cotton.

Except where otherwise stated, the parts and percentages in the following examples represent parts and percentages by weight, and the temperatures are given in degrees centigrade. The relationship of parts by weight to parts by volume is the same as that of the kilogram to the liter.

EXAMPLE 1

7 parts of the dye of the formula

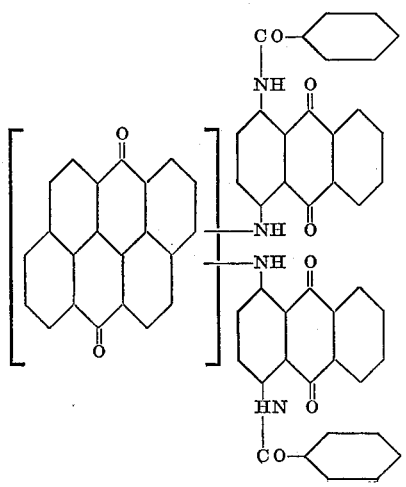

are added at room temperature to 180 parts of oleum of 10% SO$_3$ content and dissolved. The solution is maintained at 20–30° C. for 1 hour whilst stirring, and then heated to 50° C. over a period of 1 hour and then to 80–85° C. over a period of 5 hours. When cold, the reaction mixture is carefully poured on to ice, the precipitated dye filtered off and then suspended in 1000 parts of water. It is neutralized at 70–80° C. with sodium hydroxide solution, 20 parts of sodium chloride added, the precipitated dye isolated by filtration and then dried.

The new dyestuff sulfonic acid thus produced yields strong brownish violet dyeings of excellent fastness on cotton and regenerated cellulose from an alkaline hydrosulfite vat.

EXAMPLE 2

2.5 parts of diphenyl-4-carboxylic acid are heated to 95° C. over a period of 2 hours in 100 parts of dry nitrobenzene with 2.0 parts of thionylchloride and 0.1 part of pyridine (stirring continuously) and thereby converted into carboxylic acid chloride. 3.8 parts of the compound with the formula

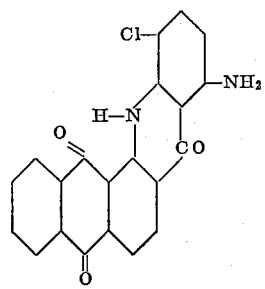

are added to the clear, light yellow carboxylic acid chloride solution, and the whole stirred well for 16 hours at 140–145° C. After cooling to room temperature, the acylation product is isolated by filtration and dried.

3.6 parts of the products thus obtained are then added to 100 parts of 1% oleum and stirred for 3 hours at 4–8° C. The resulting solution is then poured on to ice, the dry suspension filtered and the filter cakes freed from acid by washing with water. The cakes are slurried with a little water and the pH adjusted to 9 with a dilute solution of sodium hydroxide. The dye is completely precipitated from the resulting violet-blue solution by the addition of sodium chloride, isolated by filtration and then dried at 70° in vacuum.

The dye thus obtained, which presumably has the formula

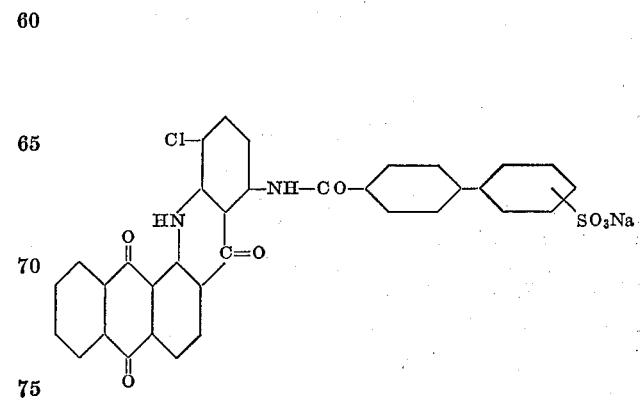

dyes cotton and regenerated cellulose wine-red shades of very good fastness to washing, chlorine and light.

EXAMPLE 3

3.0 parts of thiophene-2-carboxylic acid-4-sulfochloride are heated to 100–110° C. over a period of one hour (whilst stirring) in 100 parts of anhydrous pyridine with 3.8 parts of the compound of the formula

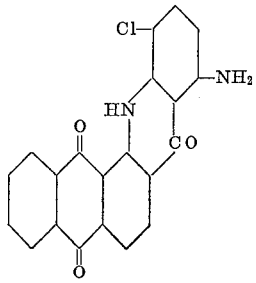

When cold, the reaction mixture is dissolved at 50–60° C. in 1200 parts of water and adjusted to pH 8 with sodium hydroxide solution. 100 parts of sodium chloride are added to the solution and the precipitated product isolated by filtration and dried.

The dye thus obtained of the formula

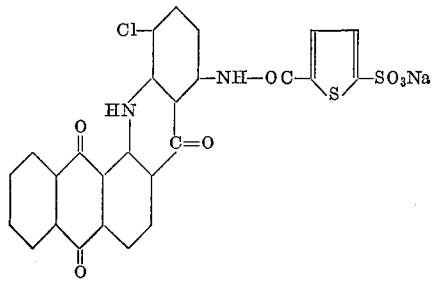

dyes cotton and regenerated cellulose very level and fast-to-washing violet shades from a hydrosulfite vat.

If an equivalent amount of benzoic acid-m-sulfochloride or benzoic acid-p-sulfochloride or benzoyl-chloride sulfonic acid is used in this example instead of the thiophene-2-carboxylic acid-5-sulfochloride, a dye is obtained exhibiting similar, good properties.

EXAMPLE 4

6.8 parts of 2-amino-3:4-phthaloylacridone are added to 170 parts of dry nitrobenzene, and 0.2 part of pyridine added. The whole is heated to 170° C. and a solution of 2.2 parts of terephthaloyl chloride in 30 parts of nitrobenzene dropped in at this temperature. After this addition, the whole is stirred for 18 hours at 170° C., filtered when cold, the filter cakes washed with benzene and dried in vacuum at 50° C.

1.52 parts of the dye thus obtained and having the formula

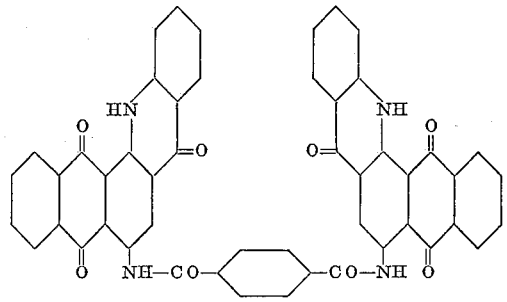

are added to 60 parts of oleum ($SO_3$ content 10%) at room temperature, stirred for 4 hours at 25–30° C. and finally for half an hour at 45–50° C., the whole cooled immediately, poured on to 800 parts of an ice and water mixture, filtered, the residue dissolved in approximately 1000 parts of water at 70–80° C., the solution adjusted to pH 9 with a solution of sodium hydroxide, filtered hot, and the dye precipitated out of the filtrate by the addition of 7% of sodium chloride. When the dye is isolated by filtration it is freed from alkali by washing with a solution of sodium chloride and dried in vacuum at 60–70° C.

The water-soluble powder thus obtained dyes cotton and regenerated cellulose violet shades of good fastness from an alkaline hydrosulfite vat. The dye contains two sulfonic acid groups per molecule.

Dyes of similar fastness are obtained by using equivalent amounts of the dicarboxylic acid dichlorides tabulated below instead of the terephthaloyl chloride:

| I<br>Dicarboxylic acid dichloride | II<br>Parts |
|---|---|
| Cl—CO—CO—Cl | 63.5 |
| Cl—CO—CH$_2$—CH$_2$—CO—Cl | 77.5 |
| Cl—CO—C=C—CO—Cl | 75.5 |
| Cl—CO—C$_6$H$_4$—CO—Cl | 102 |
| naphthalene-CO—Cl, O=C—Cl | 126 |
| OC(Cl)—C$_6$H$_4$—C$_6$H$_4$—CO—Cl | 140 |
| OC(Cl)—C$_6$H$_4$—SO$_2$—C$_6$H$_4$—CO—Cl | 172 |
| OC(Cl)—C$_6$H$_4$—CH$_2$—C$_6$H$_4$—CO—Cl | 147 |
| OC(Cl)—C$_6$H$_4$—NH—C$_6$H$_4$—CO—Cl | 148 |
| (CO—Cl)C$_6$H$_4$—N=N—C$_6$H$_4$(CO—Cl) | 153 |
| OC(Cl)—thiophene—CO—Cl | 158 |
| OC(Cl)—pyridine—CO—Cl | 146 |
| thianthrene—CO—Cl, OC(Cl)— | 170 |
| thiadiazole-fused system with COCl, ClOC | 195.5 |

EXAMPLE 5

210 parts of the dye of the formula

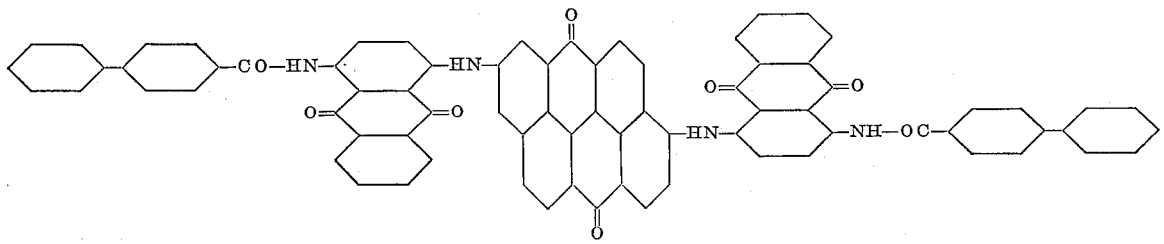

produced by condensation of 2:8-dibromoanthanthrone with 1-amino-4-(4'-phenyl-benzoylamino)-anthraquinone, are dissolved in 80 parts by volume of 1% oleum at room temperature. The solution is stirred for 1 hour at this temperature and poured on to 400 parts of a mixture of ice and water. The precipitated dye is isolated by filtration, suspended in water, and then worked up as described in Example 2.

The dye, which, as a free acid, presumably has the formula

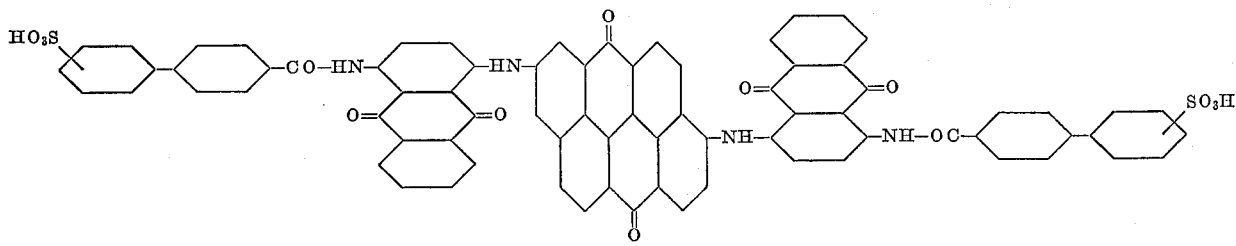

dyes cotton and regenerated cellulose fast grey to greenish grey shades from a violet hydrosulfite vat.

Dyes of similar, good fastness are obtained by using 1-amino-4-(α-naphthoyl amino)-anthraquinone or 1-amino-4-(β-naphthoyl amino)-anthraquinone instead of the 1-amino-4-(4'-phenyl-benzoyl amino)-anthraquinone.

EXAMPLE 6

7.6 parts of aminochloroacridone of the formula

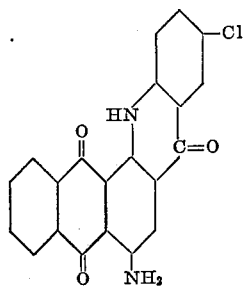

are added to 180 parts of dry nitrobenzene, 0.15 part of pyridine added, heated to 160° C. and a solution of 2.2 parts of 4:4'-diphenyl dicarboxylic acid dichloride in 40 parts of nitrobenzene dropped in at this temperature. Stirring is continued for 12 hours at 140–145° C. and, when cold, the product of condensation isolated by filtration and dried in vacuum at 90° C.

1.5 parts of the product thus produced is added to 60 parts of oleum ($SO_3$ content 5%) at room temperature and the whole stirred for about 4 hours with slight warming until a sample is soluble in a dilute solution of sodium hydroxide. The mixture is then immediately poured on to ice, the precipitated dye sulfonic acid isolated by filtration and the bulk of the adhering sulfuric acid washed out with water. The product is then slurried with a little water, adjusted to pH 9 with a dilute solution of sodium hydroxide, and the sodium salt of the dye isolated in the usual manner and dried.

The dye thus produced of the formula

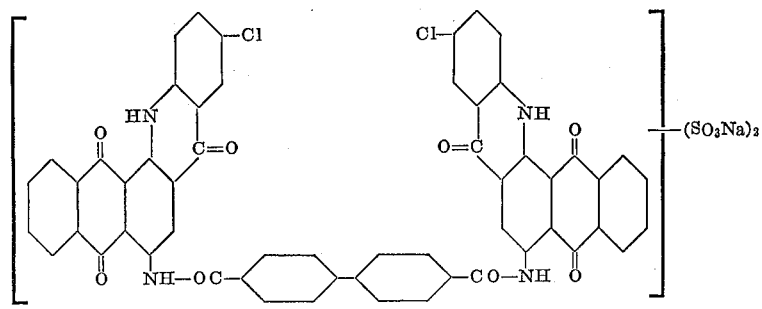

dyes cotton and regenerated cellulose very level, fast-to-light and fast-to-washing blue shades from an alkaline hydrosulfite vat.

EXAMPLE 7

7.6 parts of 3'-chloro-6'-amino-2:1(N)-1':2'-(N)-anthraquinone benzene acridone and 8.0 parts of isophthalic acid dichloride are finely ground in 50 parts of dry nitrobenzene in a ball mill. The reaction mixture is then transferred to a reaction flask, heated to 45° C. over a period of 1 hour whilst stirring, and then for a further hour up to 90° C. When cold, the condensation product is separated, washed with a little acetone and dried in vacuum.

5.0 parts of the monoacylation product thus obtained having the formula

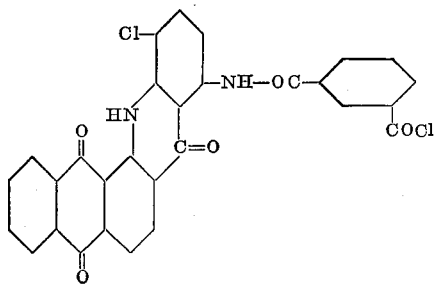

are slurried in 100 parts of nitrobenzene, heated to 120° C. and then a solution of 2.7 parts of 1-amino-5-nitroanthraquinone in 50 parts of nitrobenzene added. The whole is heated to 130–140° C. over a period of 8 hours, cooled to room temperature, the condensation product isolated by filtration, washed with acetone and dried in vacuum at 70° C.

The product thus obtained is treated in the usual manner with phenylhydrazine in o-dichlorobenzene to reduce the nitro group.

5 parts of the amino compound thus produced are stirred for 2 hours at 100–110° C. together with 6 parts of benzoic acid-p-sulfochloride in 100 parts of anhydrous pyridine. When cold, the whole is poured into 1200 parts of water and adjusted to pH 8.5 at 50–60° C. with a dilute solution of sodium hydroxide. When 100 parts of sodium chloride are added, the dye of the formula precipitates and is then dried in vacuum at 70–80° C.

It dyes cotton and regenerated cellulose red shades exhibiting excellent levelness and good fastness from an alkaline hydrosulfite vat.

EXAMPLE 8

2.5 parts of 2-mercapto-benzothiazole carboxylic acid-(6), 25 parts of thionylchloride and 0.1 part of dimethyl formamide are warmed under reflux until a clear solution is obtained. The excess thionyl chloride is then distilled off in vacuum and the remaining 2-mercapto-benzothiazole carboxylic acid chloride-(6) dissolved in 150 parts of trichlorobenzene whilst heating to 100° C. 3.8 parts of 3'-chloro - 6' - amino-2:1(N)-1':2'(N)-anthraquinone benzene acridone are then added and condensing carried out for 16 hours at 140–145° C. whilst stirring well. When cold, the condensation product of the formula is isolated by filtration and dried in vacuum at 70° C.

5 parts of the compound thus obtained are dissolved at 50° C. with the concurrent vatting in 500 parts of water containing 10 parts of a 30% solution of sodium hydroxide and 5 parts of sodium dithionite. This solution is then poured into 500 parts of a 15% solution of hydrogen peroxide whilst stirring well, and the temperature maintained at 40° C. for 3 hours.

The dye with the formula is precipitated by the addition of 100 parts of sodium chloride and isolated by filtration.

It dyes cotton and regenerated cellulose fast-to-light and fast-to-washing shades of wine red from an alkaline hydrosulfite vat.

Dyeing procedure 0.2 part of dye is dissolved in 50 parts of hot water. The solution is then poured into a solution of 2 parts by volume of a 30% solution of sodium hydroxide and 1.2 parts of sodium hydrosulfite in 350 parts of water, at 50° C. 10 parts of cotton are entered immediately and dyed for 45 minutes at 40–50° C. with the addition of 8 parts of sodium chloride. When dyeing is completed, the dyeing is oxidized, washed off, soured off, well rinsed, and then soaped at the boil.

What is claimed is:

1. α-Sulfobenzoylamino phthaloylacridone.
2. α-Sulfothenoylamino phthaloylacridone whose amine group bears the sulfothiophene carboxylic acid bound to the nitrogen atom of the amino group through its —CO— group.
3. The dyestuff of the formula 4. The dyestuff of the formula

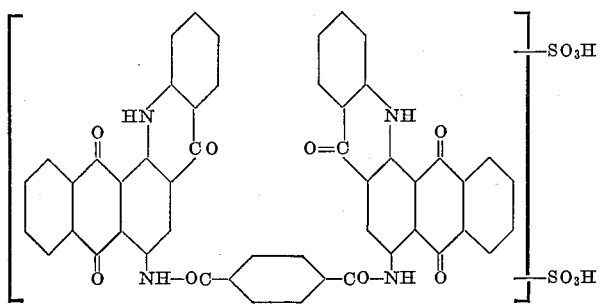

References Cited by the Examiner

UNITED STATES PATENTS

| | | | |
|---|---|---|---|
| 1,969,210 | 8/1934 | Dettwyler et al. | 260—276 |
| 2,266,782 | 12/1941 | Luleck et al. | 260—276 |
| 2,347,252 | 4/1944 | Buxbaum | 260—276 |
| 2,481,744 | 9/1949 | Heslop et al. | 260—276 |
| 2,524,524 | 10/1950 | Gutzwiller | 260—316 |
| 2,645,645 | 7/1953 | Randall et al. | 260—359 |
| 2,658,899 | 11/1953 | Ogilvie | 260—316 |
| 2,666,767 | 1/1954 | Randall et al. | 260—359 |
| 2,680,114 | 6/1954 | Sartori | 260—256.5 |
| 2,719,838 | 10/1955 | Deinet | 260—303 |
| 2,719,839 | 10/1955 | Deinet | 260—276 |
| 2,803,630 | 8/1957 | Oppliger | 260—276 |
| 2,908,684 | 10/1959 | Martin et al. | 260—276 |
| 2,985,656 | 6/1961 | Weber | 260—329.2 X |

FOREIGN PATENTS 319,949  4/1957  Switzerland.

OTHER REFERENCES

Lubs: Chemistry of Synthetic Dyes and Pigments, page 393 (1955).

HENRY R. JILES, *Acting Primary Examiner.*

DUVAL T. McCLUTCHEN, NICHOLAS S. RIZZO, *Examiners.*

D. M. KERR, D. G. DAUS, *Assistant Examiners.*